United States Patent
Fiedler et al.

(10) Patent No.: US 12,205,379 B2
(45) Date of Patent: Jan. 21, 2025

(54) PEDESTRIAN COUNTDOWN SIGNAL CLASSIFICATION TO INCREASE PEDESTRIAN BEHAVIOR LEGIBILITY

(71) Applicant: Waymo LLC, Mountain View, CA (US)

(72) Inventors: Ingrid Fiedler, Mountain View, CA (US); David Margines, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 351 days.

(21) Appl. No.: 17/879,857

(22) Filed: Aug. 3, 2022

(65) Prior Publication Data

US 2023/0041448 A1    Feb. 9, 2023

Related U.S. Application Data

(60) Provisional application No. 63/229,226, filed on Aug. 4, 2021.

(51) Int. Cl.
| | |
|---|---|
| *G06V 20/58* | (2022.01) |
| *B60Q 5/00* | (2006.01) |
| *G06V 20/56* | (2022.01) |

(52) U.S. Cl.
CPC ............. *G06V 20/58* (2022.01); *B60Q 5/005* (2013.01); *G06V 20/588* (2022.01)

(58) Field of Classification Search
CPC ........ B60Q 1/346; B60Q 1/268; G08G 1/166; G08G 1/005; B25J 9/161; G05D 1/0282
See application file for complete search history.

(56) References Cited

U.S. PATENT DOCUMENTS 9,849,876 B2 * 12/2017 Morales Teraoka .. B60W 30/14
9,884,583 B2 *  2/2018 Trinh ........................ G06F 3/167
(Continued)

FOREIGN PATENT DOCUMENTS

CN          110688992 B       8/2020

OTHER PUBLICATIONS

Rasouli et al., "Autonomous Vehicles That Interact With Pedestrians: A Survey of Theory and Practice," IEEE Transactions on Intelligent Transportation Systems, vol. 21, No. 3, Mar. 2020, pp. 900-918, https://ieeexplore.ieee.org/stamp/stamp.jsp?tp=&arnumber=8667866.

(Continued)

*Primary Examiner* — Yosef Kassa
(74) *Attorney, Agent, or Firm* — MCDONNELL BOEHNEN HULBERT & BERGHOFF LLP

(57) ABSTRACT

Example embodiments relate to pedestrian countdown signal classification to increase pedestrian behavior legibility. An example embodiment includes a method that includes obtaining, by a computing system of a vehicle, a camera image patch. The method further includes determining, by the computing system, using the camera image patch and a pedestrian countdown signal classifier model, a state of a pedestrian countdown signal. The method also includes determining, by the computing system based on the state of the pedestrian countdown signal, a prediction of whether a pedestrian will enter a crosswalk governed by the pedestrian countdown signal. And the method includes, based on the prediction, causing, by the computing system, the vehicle to perform an invitation action that invites a pedestrian to enter the crosswalk.

20 Claims, 10 Drawing Sheets

(56) References Cited

U.S. PATENT DOCUMENTS

| | | | |
|---|---|---|---|
| 9,953,538 B1 * | 4/2018 | Matthiesen | B60Q 1/346 |
| 10,126,135 B2 | 11/2018 | Mortazavi et al. | |
| 10,152,892 B2 * | 12/2018 | Matthiesen | B60Q 1/346 |
| 10,269,243 B1 * | 4/2019 | Tannenbaum | G08G 1/09623 |
| 10,440,536 B2 * | 10/2019 | Nemec | H04W 4/40 |
| 10,564,639 B1 | 2/2020 | Zhu et al. | |
| 2019/0324459 A1 | 10/2019 | Baalke et al. | |

OTHER PUBLICATIONS

Rasouli et al., "Understanding Pedestrian Behavior in Complex Traffic Scenes" | IEEE Journals & Magazine | IEEE Xplore, Aug. 11, 2021, 2 pages, https://ieeexplore.ieee.org/document/8241847.

Camara et al., "Pedestrian Models for Autonomous Driving Part II: High-Level Models of Human Behavior" | IEEE Journals & Magazine | IEEE Xplore, Aug. 11, 2021, 2 pages, https://ieeexplore.ieee.org/stamp/stamp.jsp?tp=&arnumber=9151337.

Hbaieb et al., "Pedestrian Detection for Autonomous Driving within Cooperative Communication System" | IEEE Conference Publication | IEEE Xplore, Aug. 11, 2021, 2 pages, https://ieeexplore.ieee.org/document/8886037.

\* cited by examiner

PEDESTRIAN COUNTDOWN SIGNAL CLASSIFICATION TO INCREASE PEDESTRIAN BEHAVIOR LEGIBILITY

CROSS-REFERENCE TO RELATED APPLICATIONS

This application claims priority to U.S. Patent Application No. 63/229,226, filed Aug. 4, 2021, which is incorporated herein by reference.

BACKGROUND

Unless otherwise indicated herein, the description in this section is not prior art to the claims in this application and is not admitted to be prior art by inclusion in this section.

Conventional autonomous vehicles use traffic signal state information to help navigate through intersections. For instance, an autonomous vehicle can use the state of a detected traffic signal to determine whether to stop or proceed through a traffic intersection.

Autonomous vehicles operating in urban areas are capable of detecting pedestrians, such as pedestrians walking within a crosswalk at a traffic intersection and pedestrians waiting to enter a crosswalk.

SUMMARY

Some crosswalks are governed by pedestrian countdown signals that control pedestrian traffic through crosswalks. For instance, a pedestrian countdown signal can display a walk signal, a do not walk signal, or a countdown indicative of an amount of time remaining for a pedestrian to cross an intersection. Current autonomous vehicles typically do not process pedestrian countdown signals. This limits the ability of autonomous vehicles to predict and plan around the actions of pedestrians that make decisions based on pedestrian countdown signals. This also limits the ability of autonomous vehicles to safely interact and communicate with pedestrians utilizing crosswalks. Accordingly, systems and methods that classify states of pedestrian countdown signals and allow autonomous vehicles to safely respond to and interact with pedestrians utilizing crosswalks are provided.

In a first aspect, a computer-implemented method includes obtaining, by a computing system of a vehicle, a camera image patch. The method further includes determining, by the computing system, using the camera image patch and a pedestrian countdown signal classifier model, a state of a pedestrian countdown signal. The method also includes determining, by the computing system based on the state of the pedestrian countdown signal, a prediction of whether a pedestrian will enter a crosswalk governed by the pedestrian countdown signal. And the method includes, based on the prediction, causing, by the computing system, the vehicle to perform an invitation action that invites a pedestrian to enter the crosswalk.

In a second aspect, a vehicle configured to be operated in an autonomous mode includes a memory, a processor coupled to the memory, and instruction stored in the memory and executable by the processor to perform functions. The functions include obtaining a camera image patch. The functions further include determining, using the camera image patch and a pedestrian countdown signal classifier model, a state of a pedestrian countdown signal. The functions also include determining, based on the state of the pedestrian countdown signal, a prediction of whether a pedestrian will enter a crosswalk governed by the pedestrian countdown signal. And the functions include, based on the prediction, causing the vehicle to perform an invitation action that invites a pedestrian to enter the crosswalk.

In a third aspect, a non-transitory computer-readable medium stores instructions that are executable by a computing system to cause the computing system to perform functions. The functions include obtaining a camera image patch. The functions further include determining, using the camera image patch and a pedestrian countdown signal classifier model, a state of a pedestrian countdown signal. The functions also include determining, based on the state of the pedestrian countdown signal, a prediction of whether a pedestrian will enter a crosswalk governed by the pedestrian countdown signal. And the functions include, based on the prediction, causing a vehicle to perform an invitation action that invites a pedestrian to enter the crosswalk.

These as well as other aspects, advantages, and alternatives will become apparent to those of ordinary skill in the art by reading the following detailed description, with reference, where appropriate, to the accompanying drawings.

DETAILED DESCRIPTION

Figure 1:
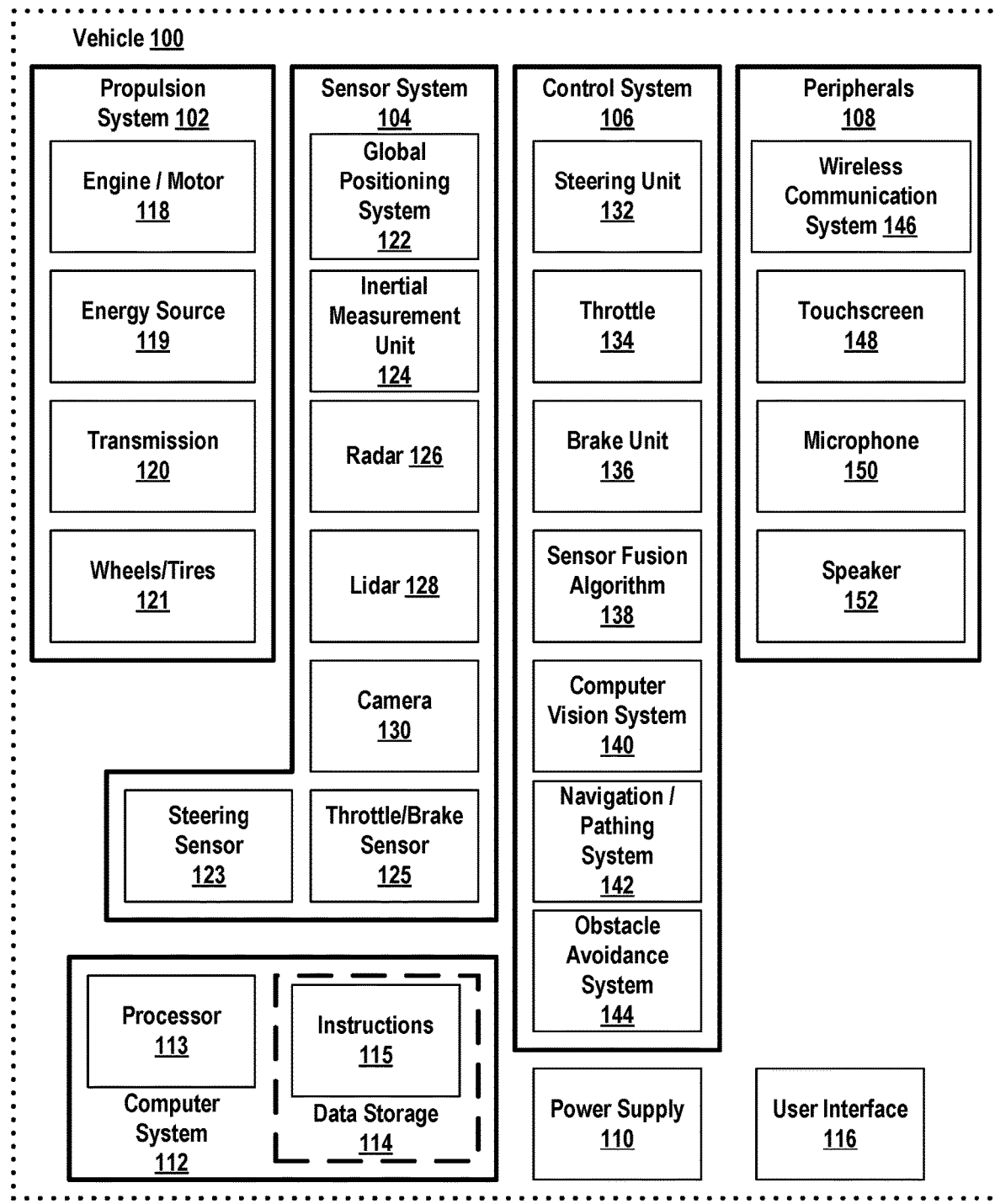
FIG. 1 is a functional block diagram illustrating a vehicle, according to example embodiments.
Figure 2A:
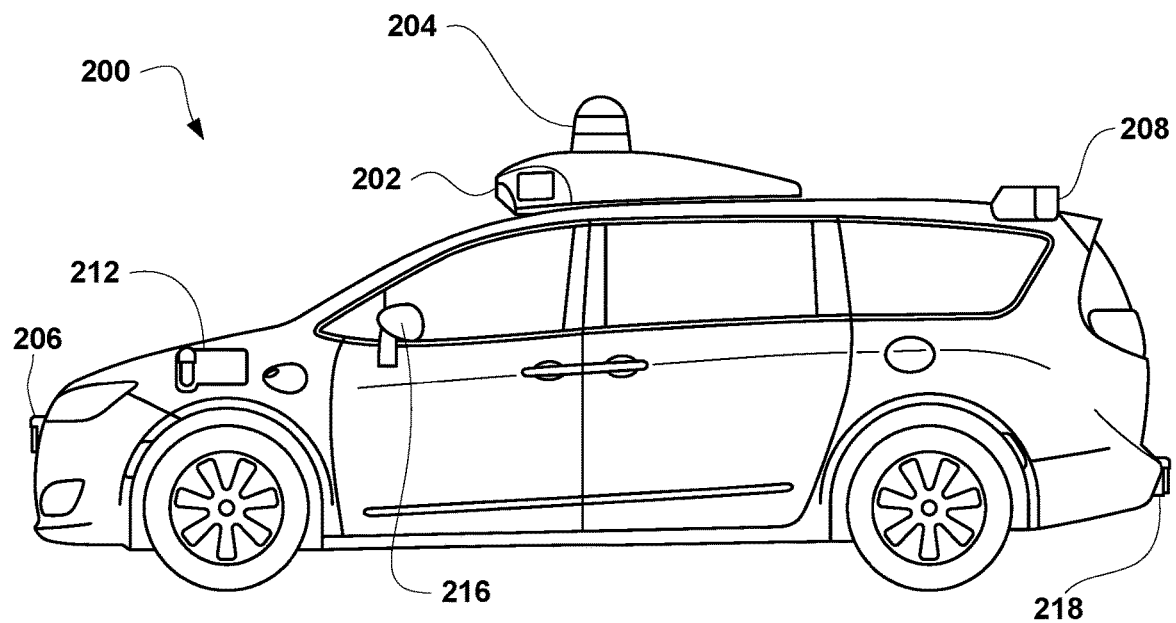
FIG. 2A is an illustration of a physical configuration of a vehicle, according to example embodiments.
Figure 2B:
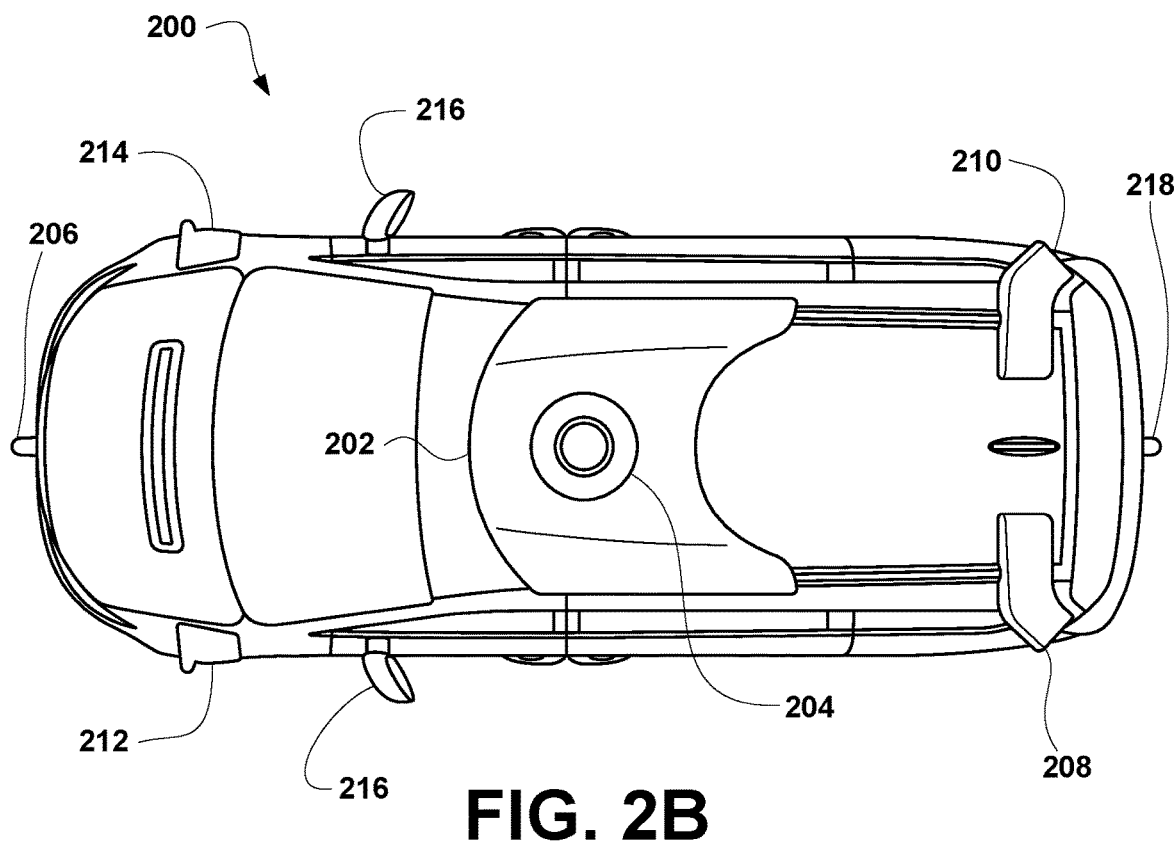
FIG. 2 is an illustration of a physical configuration of a vehicle, according to example embodiments.
FIG. 2C is an illustration of a physical configuration of a vehicle, according to example embodiments.
FIG. 2D is an illustration of a physical configuration of a vehicle, according to example embodiments.
FIG. 2E is an illustration of a physical configuration of a vehicle, according to example embodiments.
Figure 2C:
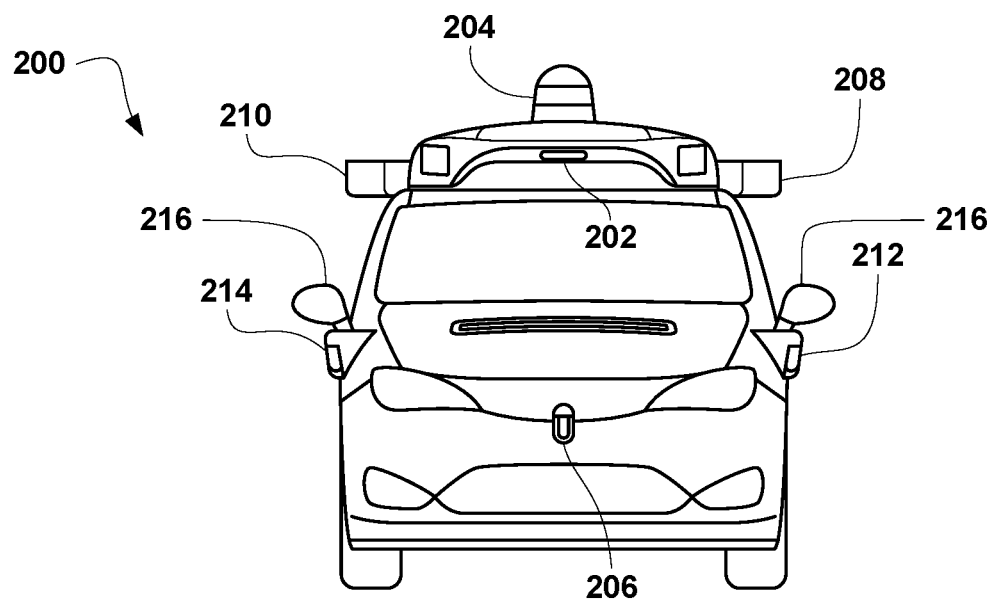
Figure 2D:
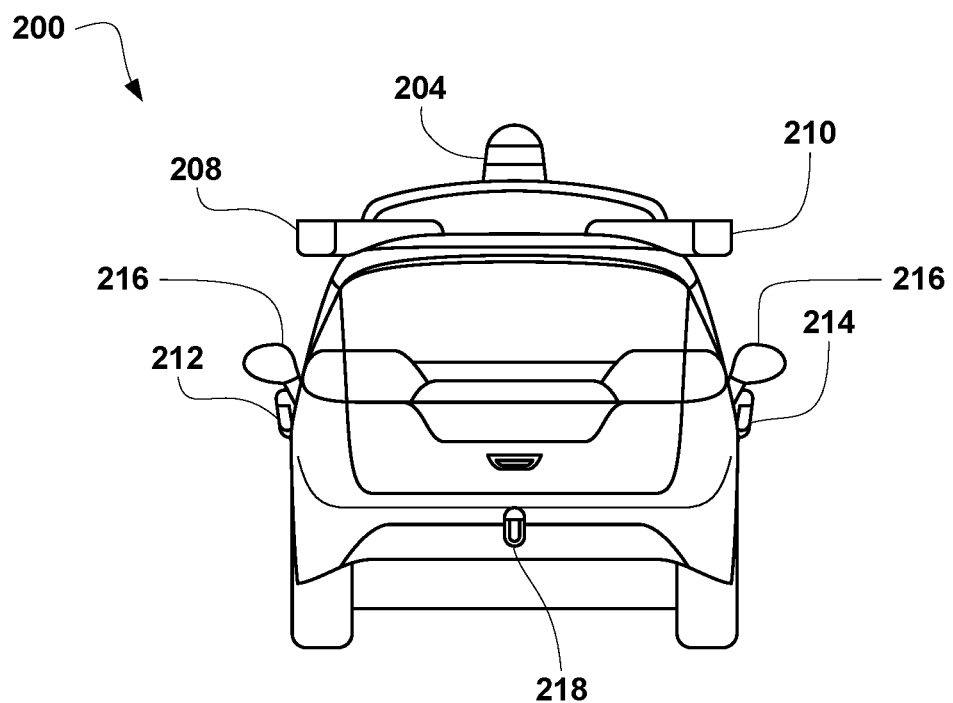
Figure 2E:
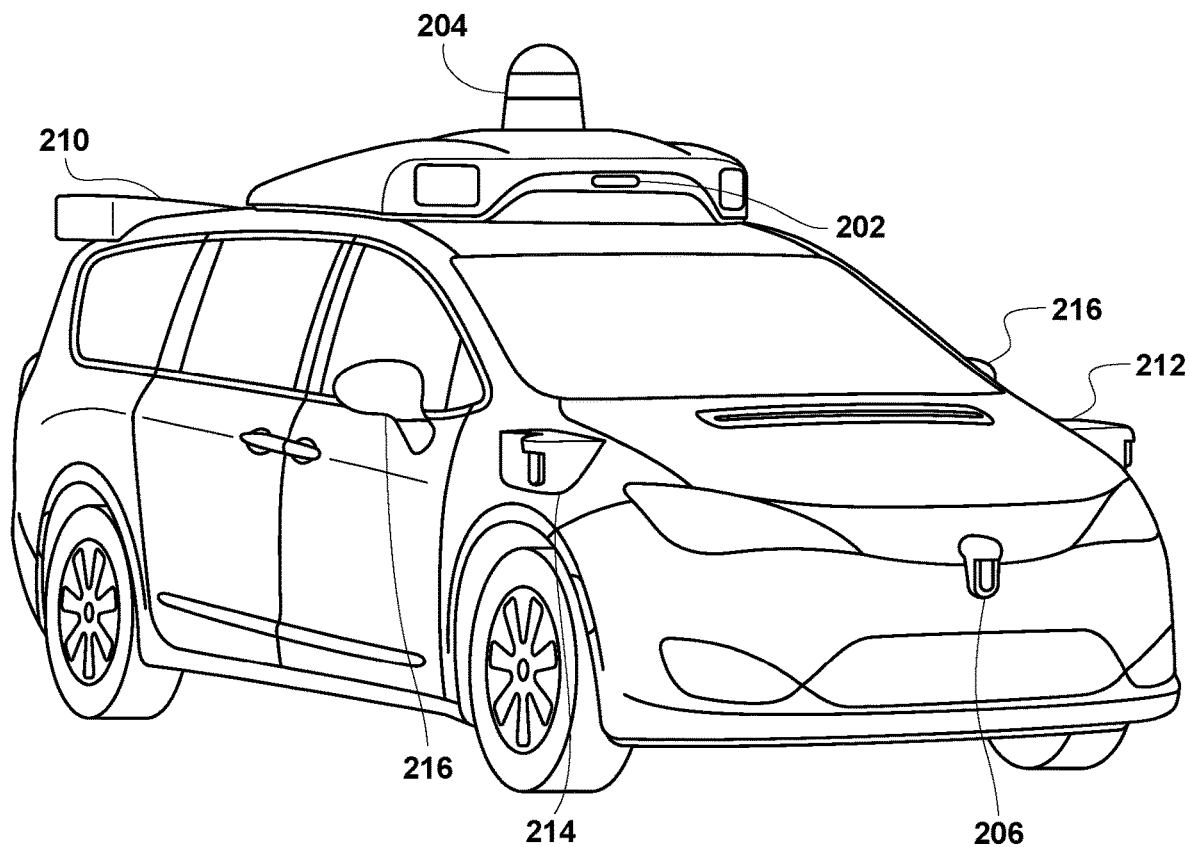

Example methods and systems are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

As noted above, current autonomous vehicles typically do not process pedestrian countdown signals. This limits the ability of autonomous vehicles to predict and plan around the actions of pedestrians that make decisions based on pedestrian countdown signals. This also limits the ability of autonomous vehicles to safely interact and communicate with pedestrians utilizing crosswalks.

In an example method, a computing system of a vehicle can obtain a camera image patch that depicts a pedestrian countdown signal. The computing system can then use a pedestrian countdown signal classifier model to classify a state of the pedestrian countdown signal. For instance, the pedestrian countdown signal classifier model can be configured to classify the state of the pedestrian countdown signal as being one of multiple states using the camera image patch. After determining the state of the pedestrian countdown signal, the computing system can determine a prediction of whether a pedestrian will enter a crosswalk governed by the pedestrian countdown signal. Based on the prediction, the computing system can cause the vehicle to perform an invitation action that invites a pedestrian to enter the crosswalk.

The computing system can use mapped positions of pedestrian countdown signals to select camera image patches in which pedestrian countdown signals are visible. For example, a database can store the geographical position, height, and yaw for pedestrian countdown signals in a city. When a vehicle is within a predefined distance of a mapped position of a pedestrian countdown signal and an orientation of the vehicle is within a threshold of the yaw of the pedestrian countdown signal, a camera coupled to the vehicle can capture an image. Further, after capturing an image of a pedestrian countdown signal, the computing system can select a camera image patch within the captured image that is expected to depict the pedestrian countdown signal. The computing system can select the camera image patch based on a position and orientation of the vehicle with respect to the position and height of the pedestrian countdown signal.

The pedestrian countdown signal classifier model can be a classification convolutional neural network (CNN) that is configured to classify the state of the pedestrian countdown signal as being one of multiple states. For instance, the classification CNN can classify the state of the pedestrian countdown signal as being a walk state, a do not walk state, or a countdown state. In some embodiments, the classification CNN can classify the state using just a single camera image patch.

Based on the state of the pedestrian countdown signal, the computing system can determine a prediction of whether a pedestrian will enter a crosswalk governed by the pedestrian countdown signal. For instance, the computing system can predict that a pedestrian will enter the crosswalk based on the state of the pedestrian countdown signal being a walk state or a countdown state. Based on predicting that the pedestrian will enter the crosswalk, the computing system can cause the vehicle to perform the invitation action that invites the pedestrian to enter the crosswalk. The invitation action can include turning toward the crosswalk and then stopping before entering the crosswalk, illuminating a light source, displaying a message, and/or outputting a sound. As described below, the computing system can also use the state of a pedestrian countdown signal in other ways.

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks (e.g., pickup trucks, vans, tractors, tractor trailers, etc.), motorcycles, buses, airplanes, helicopters, drones, lawn mowers, earth movers, boats, submarines, all-terrain vehicles, snowmobiles, aircraft, recreational vehicles, amusement park vehicles, farm equipment or vehicles, construction equipment or vehicles, warehouse equipment or vehicles, factory equipment or vehicles, trams, golf carts, trains, trolleys, sidewalk delivery vehicles, robot devices, etc. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. Additionally, example vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, vehicle 100 may also include subsystems that enable the driver to control operations of vehicle 100 such as steering, acceleration, and braking, while the computing system performs assistive functions such as lane-departure warnings/lane-keeping assist or adaptive cruise control based on other objects (e.g., vehicles, etc.) in the surrounding environment.

As described herein, in a partially autonomous driving mode, even though the vehicle assists with one or more driving operations (e.g., steering, braking and/or accelerating to perform lane centering, adaptive cruise control, advanced driver assistance systems (ADAS), emergency braking, etc.), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, these or similar systems and methods can be used in various driver assistance systems that do not rise to the level of fully autonomous driving systems (i.e. partially autonomous driving systems). In the United States, the Society of Automotive Engineers (SAE) have defined different levels of automated driving operations to indicate how much, or how little, a vehicle controls the driving, although different organizations, in the United States or in other countries, may categorize the levels differently. More specifically, the disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway, etc.) conditions. Likewise, the disclosed systems and methods can be used in vehicles that use SAE Level 4 self-driving systems that operate autonomously under most regular driving situations and require only occasional attention of the human operator. In all such systems, accurate lane estimation can be performed automatically without a driver input or control (e.g., while the vehicle is in motion, etc.) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

As shown in FIG. 1, vehicle 100 may include various subsystems, such as propulsion system 102, sensor system 104, control system 106, one or more peripherals 108, power supply 110, computer system 112 (which could also be referred to as a computing system) with data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118, etc.). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, lidar 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, brake wear, etc.).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the surrounding environment of vehicle 100. As such, radar 126 may include antennas configured to transmit and receive radio signals. In some embodiments, radar 126 may correspond to a mountable radar configured to obtain measurements of the surrounding environment of vehicle 100.

Lidar 128 may include one or more laser sources, a laser scanner, and one or more detectors, among other system components, and may operate in a coherent mode (e.g., using heterodyne detection, etc.) or in an incoherent detection mode (i.e., time-of-flight mode). In some embodiments, the one or more detectors of the lidar 128 may include one or more photodetectors, which may be especially sensitive detectors (e.g., avalanche photodiodes, etc.). In some examples, such photodetectors may be capable of detecting single photons (e.g., single-photon avalanche diodes (SPADs), etc.). Further, such photodetectors can be arranged (e.g., through an electrical connection in series, etc.) into an array (e.g., as in a silicon photomultiplier (SiPM), etc.). In some examples, the one or more photodetectors are Geiger-mode operated devices and the lidar includes subcomponents designed for such Geiger-mode operation.

Camera 130 may include one or more devices (e.g., still camera, video camera, a thermal imaging camera, a stereo camera, a night vision camera, etc.) configured to capture images of the surrounding environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve, a carburetor, etc.). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fission algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software (e.g., a general purpose processor such as a central processing unit (CPU), a specialized processor such as a graphical processing unit (GPU) or a tensor processing unit (TPU), an application-specific integrated circuit (ASIC), a field programmable gate array (FPGA), a volatile memory, a non-volatile memory, one or more machine-learned models, etc.) operable to process and analyze images in an effort to determine objects that are in motion (e.g., other vehicles, pedestrians, bicyclists, animals, etc.) and objects that are not in motion (e.g., traffic lights, roadway boundaries, speedbumps, potholes, etc.). As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, interior microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic, etc.) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/input devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, control system 106, etc.), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective system. For instance, in an example embodiment, camera 130 could capture a plurality of images that could represent information about a state of a surrounding environment of vehicle 100 operating in an autonomous or semi-autonomous mode. The state of the surrounding environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 and/or lidar 128, and/or some other environmental mapping, ranging, and/or positioning sensor system may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E show an example vehicle 200 (e.g., a fully autonomous vehicle or semi-autonomous vehicle, etc.) that can include some or all of the functions described in connection with vehicle 100 in reference to FIG. 1. Although vehicle 200 is illustrated in FIGS. 2A-2E as a van with side view mirrors for illustrative purposes, the present disclosure is not so limited. For instance, the vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and robot devices, etc.).

The example vehicle 200 may include one or more sensor systems 202, 204, 206, 208, 210, 212, 214, and 218. In some embodiments, sensor systems 202, 204, 206, 208, 210, 212, 214, and/or 218 could represent one or more optical systems (e.g. cameras, etc.), one or more lidars, one or more radars, one or more inertial sensors, one or more humidity sensors, one or more acoustic sensors (e.g., microphones, sonar devices, etc.), or one or more other sensors configured to sense information about an environment surrounding the vehicle 200. In other words, any sensor system now known or later created could be coupled to the vehicle 200 and/or could be utilized in conjunction with various operations of the vehicle 200. As an example, a lidar could be utilized in self-driving or other types of navigation, planning, perception, and/or mapping operations of the vehicle 200. In addition, sensor systems 202, 204, 206, 208, 210, 212, 214, and/or 218 could represent a combination of sensors described herein (e.g., one or more lidars and radars; one or more lidars and cameras; one or more cameras and radars; one or more lidars, cameras, and radars; etc.).

Note that the number, location, and type of sensor systems (e.g., 202, 204, etc.) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, to adapt to specialized environmental or application circumstances, etc.). For example, the sensor systems (e.g., 202, 204, etc.) could be disposed in various other locations on the vehicle (e.g., at location 216, etc.) and could have fields of view that correspond to internal and/or surrounding environments of the vehicle 200.

The sensor system 202 may be mounted atop the vehicle 200 and may include one or more sensors configured to detect information about an environment surrounding the vehicle 200, and output indications of the information. For example, sensor system 202 can include any combination of cameras, radars, lidars, inertial sensors, humidity sensors, and acoustic sensors (e.g., microphones, sonar devices, etc.). The sensor system 202 can include one or more movable mounts that could be operable to adjust the orientation of one or more sensors in the sensor system 202. In one embodiment, the movable mount could include a rotating platform that could scan sensors so as to obtain information from each direction around the vehicle 200. In another embodiment, the movable mount of the sensor system 202 could be movable in a scanning fashion within a particular range of angles and/or azimuths and/or elevations. The sensor system 202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of the sensor locations 202, 204, 206, 208, 210, 212, 214, and/or 218. For example, there may be two lidar devices mounted at a sensor location and/or there may be one lidar device and one radar mounted at a sensor location.

The one or more sensor systems 202, 204, 206, 208, 210, 212, 214, and/or 218 could include one or more lidar sensors. For example, the lidar sensors could include a plurality of light-emitter devices arranged over a range of angles with respect to a given plane (e.g., the x-y plane, etc.).

For example, one or more of the sensor systems 202, 204, 206, 208, 210, 212, 214, and/or 218 may be configured to rotate or pivot about an axis (e.g., the z-axis, etc.) perpendicular to the given plane so as to illuminate an environment surrounding the vehicle 200 with light pulses. Based on detecting various aspects of reflected light pulses (e.g., the elapsed time of flight, polarization, intensity, etc.), information about the surrounding environment may be determined.

In an example embodiment, sensor systems 202, 204, 206, 208, 210, 212, 214, and/or 218 may be configured to provide respective point cloud information that may relate to physical objects within the surrounding environment of the vehicle 200. While vehicle 200 and sensor systems 202, 204, 206, 208, 210, 212, 214, and 218 are illustrated as including certain features, it will be understood that other types of sensor systems are contemplated within the scope of the present disclosure. Further, the example vehicle 200 can include any of the components described in connection with vehicle 100 of FIG. 1.

In an example configuration, one or more radars can be located on vehicle 200. Similar to radar 126 described above, the one or more radars may include antennas configured to transmit and receive radio waves (e.g., electromagnetic waves having frequencies between 30 Hz and 300 GHz, etc.). Such radio waves may be used to determine the distance to and/or velocity of one or more objects in the surrounding environment of the vehicle 200. For example, one or more sensor systems 202, 204, 206, 208, 210, 212, 214, and/or 218 could include one or more radars. In some examples, one or more radars can be located near the rear of the vehicle 200 (e.g., sensor systems 208, 210, etc.), to actively scan the environment near the back of the vehicle 200 for the presence of radio-reflective objects. Similarly, one or more radars can be located near the front of the vehicle 200 (e.g., sensor systems 212, 214, etc.) to actively scan the environment near the front of the vehicle 200. A radar can be situated, for example, in a location suitable to illuminate a region including a forward-moving path of the vehicle 200 without occlusion by other features of the vehicle 200. For example, a radar can be embedded in and/or mounted in or near the front bumper, front headlights, cowl, and/or hood, etc. Furthermore, one or more additional radars can be located to actively scan the side and/or rear of the vehicle 200 for the presence of radio-reflective objects, such as by including such devices in or near the rear bumper, side panels, rocker panels, and/or undercarriage, etc.

The vehicle 200 can include one or more cameras. For example, the one or more sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which the vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may also include one or more acoustic sensors (e.g., one or more of the sensor systems 202, 204, 206, 208, 210, 212, 214, 216, 218 may include one or more acoustic sensors, etc.) used to sense a surrounding environment of vehicle 200. Acoustic sensors may include microphones (e.g., piezoelectric microphones, condenser microphones, ribbon microphones, microelectromechanical systems (MEMS) microphones, etc.) used to sense acoustic waves (i.e. pressure differentials) in a fluid (e.g., air, etc.) of the environment surrounding the vehicle 200. Such acoustic sensors may be used to identify sounds in the surrounding environment (e.g., sirens, human speech, animal sounds, alarms, etc.) upon which control strategy for vehicle 200 may be based. For example, if the acoustic sensor detects a siren (e.g., an ambulatory siren, a fire engine siren, etc.), vehicle 200 may slow down and/or navigate to the edge of a roadway.

Although not shown in FIGS. 2A-2E, the vehicle 200 can include a wireless communication system (e.g., similar to the wireless communication system 146 of FIG. 1 and/or in addition to the wireless communication system 146 of FIG. 1, etc.). The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions. For example, a route taken by a vehicle from one destination to another may be modified based on driving conditions. Additionally or alternatively, the velocity, acceleration, turn angle, follow distance (i.e., distance to a vehicle ahead of the present vehicle), lane selection, etc. could all be modified in response to changes in the driving conditions.

Figure 3:
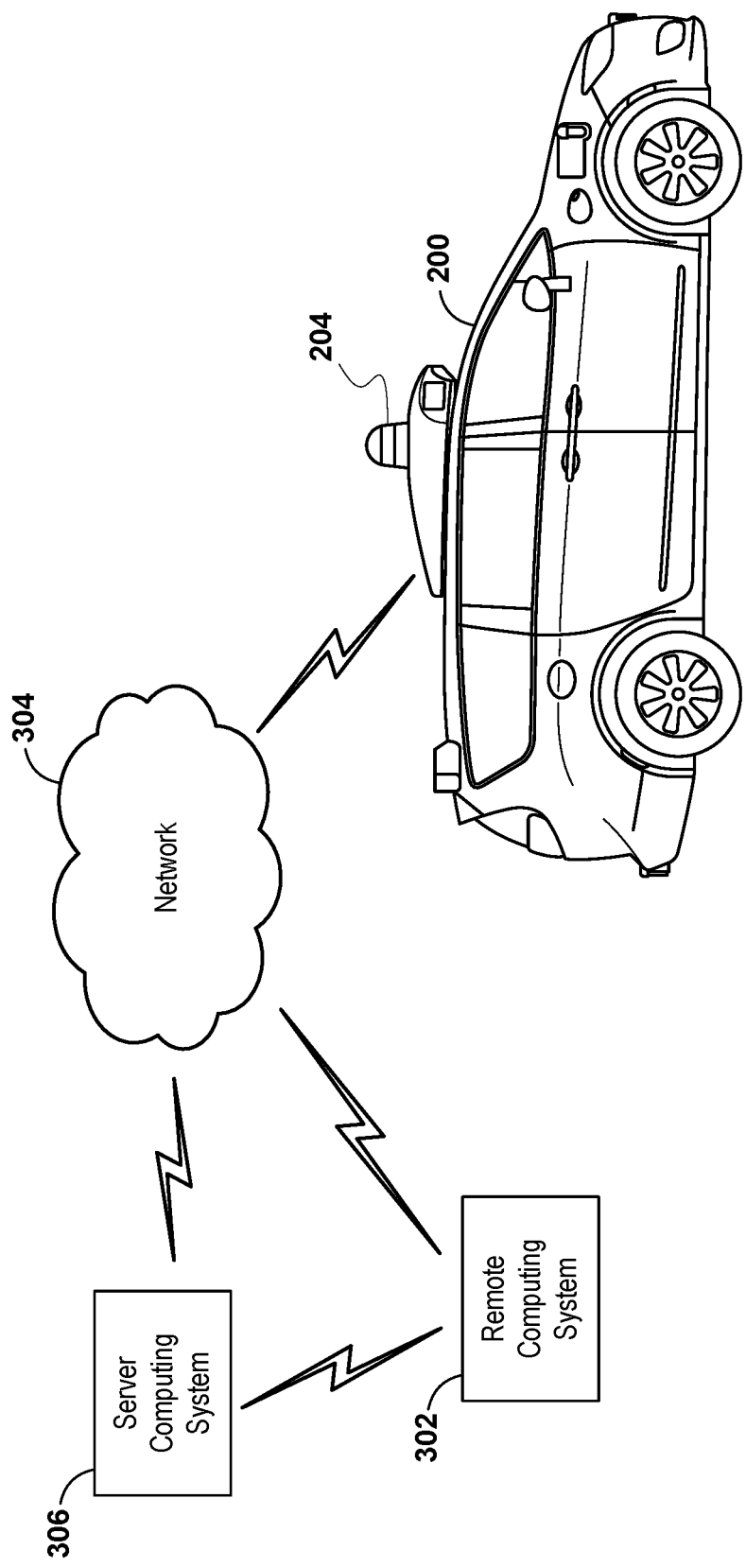
FIG. 3 is a conceptual illustration of wireless communication between various computing systems related to an autonomous or semi-autonomous vehicle, according to example embodiments.

FIG. 3 is a conceptual illustration of wireless communication between various computing systems related to an autonomous or semi-autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous or semi-autonomous mode that enables a control system to safely navigate vehicle 200 between destinations using sensor measurements. When operating in an autonomous or semi-autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone, etc.), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 307 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 305 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, a computing system local to vehicle 200, etc.) may operate to use a camera to capture images of the surrounding environment of an autonomous or semi-autonomous vehicle. In general, at least one computing system will be able to analyze the images and possibly control the autonomous or semi-autonomous vehicle.

In some embodiments, to facilitate autonomous or semi-autonomous operation, a vehicle (e.g., vehicle 200, etc.) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar, a lidar, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar may be configured to transmit an electromagnetic signal that will be reflected by various objects near the vehicle, and then capture electromagnetic signals that reflect off the objects. The captured reflected electromagnetic signals may enable the radar (or processing system) to make various determinations about objects that reflected the electromagnetic signal. For example, the distances to and positions of various reflecting objects may be determined. In some embodiments, the vehicle may have more than one radar in different orientations. The radar may be configured to store captured information to a memory for later processing by a processing system of the vehicle. The information captured by the radar may be environment data.

In another example, a lidar may be configured to transmit an electromagnetic signal (e.g., infrared light, such as that from a gas or diode laser, or other possible light source) that will be reflected by target objects near the vehicle. The lidar may be able to capture the reflected electromagnetic (e.g., infrared light, etc.) signals. The captured reflected electromagnetic signals may enable the range-finding system (or processing system) to determine a range to various objects. The lidar may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous or semi-autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous or semi-autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals, etc.), to the specified destination. Further, while the vehicle is operating autonomously or semi-autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present, etc.), (ii) confirm whether the vehicle's identification of the object is correct, (iii) correct the identification if the identification was incorrect, and/or (iv) provide a supplemental instruction (or modify a present instruction) for the autonomous or semi-autonomous vehicle. Remote assistance tasks may also include the human operator providing an instruction to control operation of the vehicle (e.g., instruct the vehicle to stop at a stop sign if the human operator determines that the object is a stop sign, etc.), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, bicyclists, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304, etc.), and in some embodiments, via a server (e.g., server computing system 306, etc.). The human operator of the remote computer system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction, etc.), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign, etc.), but may be configured to request remote assistance at the same time as (or at a later time from) when the vehicle operates in accordance with the detected object.

Figure 4:
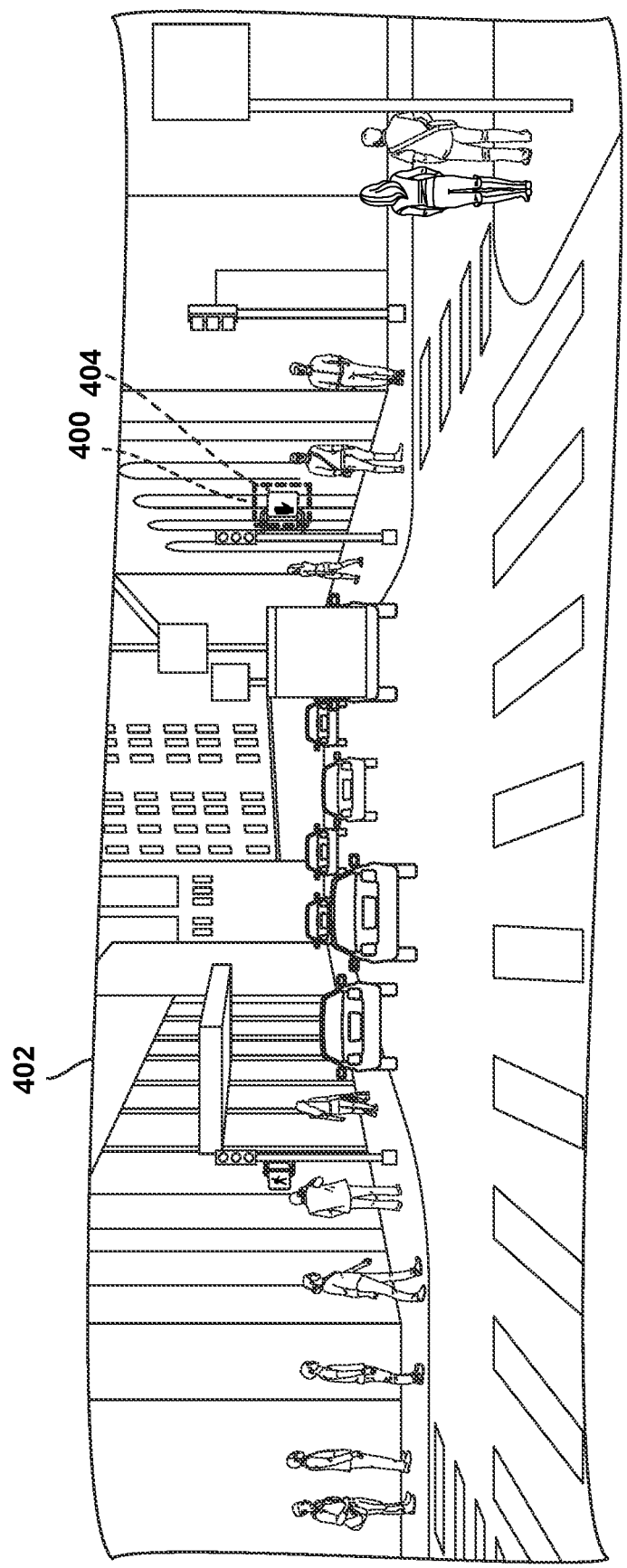
FIG. 4 is an illustration of a camera image patch, according to example embodiments.

FIG. 4 is an illustration of a camera image patch 400, according to example embodiments. In line with the discussion above, a computing system of a vehicle (e.g., vehicle 200, etc.) can use mapped positions of pedestrian countdown signals to select camera image patch 400 from within an image 402 captured by the vehicle. For example, a database can store the geographical position, height, and yaw for a pedestrian countdown signal 404. When the vehicle is within a predefined distance (e.g., 100 meters, 200 meters, etc.) of the geographical position of pedestrian countdown signal 404 and an orientation of the vehicle with respect to an orientation of pedestrian countdown signal 404 satisfies a threshold condition, a camera coupled to the vehicle can capture image 402. On the other hand, if the vehicle is within a predefined distance of the mapped position of pedestrian countdown signal 404, but the orientation of the vehicle with respect to the orientation of pedestrian countdown signal 404 does not satisfy the threshold condition, the computing system can forgo capturing an image of the pedestrian countdown signal.

Some pedestrian countdown signals have louvering which cause the pedestrian countdown signals to dim when viewed from an oblique angle. For instance, dimming may start at an observation angle of around 35 degrees off-axis from the yaw of the pedestrian countdown signal. To address this issue, the computing system can cause a camera to capture image 402 when the orientation of the vehicle with respect to the orientation of the pedestrian countdown signal is such that the camera views the angle from an angle that lies with an observation angle window of the pedestrian countdown signal.

In some examples, the observation angle window spans from an oblique angle that is 35 degrees off-axis from a left-side of the pedestrian countdown signal to 35 degrees off-axis from a right-side of the pedestrian countdown signal. With this approach, if the viewing angle of the vehicle is less than 35 degrees, the computing system can cause the camera to capture image 402. Whereas, if the viewing angle is greater than 35 degrees, the computing system can cause the camera to forgo capturing an image of the pedestrian countdown signal. The computing system can determine the viewing angle of a pedestrian countdown signal by comparing the orientation of the vehicle to the yaw of the pedestrian countdown signal.

The observation angle window may vary depending on a desired implementation. Another example of an observation angle window is from an oblique angle that is 25 degrees off-axis from a left-side of the pedestrian countdown signal to 25 degrees off-axis from a right side of the pedestrian countdown signal.

After capturing image 402, the computing system can select camera image patch 400 from within image 402 based on a region within image 402 that is expected to depict pedestrian countdown signal 404. The computing system can select camera image patch 400 based on a position and orientation of the vehicle with respect to the position and height of pedestrian countdown signal 404.

The computing system can use a classifier model to classify a state of pedestrian countdown signal 404 as one of multiple different states. The form of the classifier model can vary depending on the desired implementation.

As one example, the classifier model can include a classification CNN that is configured to classify the state of a pedestrian countdown signal as being one of multiple states (e.g., a walk state, a do not walk state, a countdown state, or an unknown state). The classification CNN can include one or more convolution layers, one or more pooling layers, and as fully connected layer. By way of example, the classification CNN can include layers arranged as follows: a first two-dimensional (2D) convolution layer (e.g., spatial convolution over image), a first pooling layer, a second 2D convolution layer, a third 2D convolution layer, a second max pooling layer, a fourth 2D convolution layer, a fifth 2D convolution layer, a third max pooling layer, a sixth 2D convolution layer, a seventh 2D convolution layer, a fourth max pooling layer, an eighth 2D convolution layer, a ninth 2D convolution layer, a fifth max pooling layer, a first dense layer, and a second dense layer.

The output of the classification CNN may be a set of classification scores (e.g., probabilities) corresponding to each of the possible states. The computing system can select the state having the highest classification score as the state of the pedestrian countdown signal depicted in the camera image patch.

In some examples, the classifier model can output both the state of the pedestrian countdown signal and a countdown value. For instance, the classifier model can be configured such that when the state is the countdown state, the classifier model outputs the countdown state as well as a countdown value. The countdown value can be indicative of an amount of time (e.g., a number of seconds) remaining before a transition to the do not walk state.

The size of the sliding window of the 2D convolution layers can vary. For instance, in some examples, the computing system can scale the camera Image patch to a 72-pixel by 72-pixel red, green, blue (RGB) patch before providing the camera image patch to the classifier model. With this approach, the sliding window may be a 3×3 pixel window. In other examples, the sliding window may be a 5×5 pixel window. Further, in some examples, the classification CNN can classify the state using just a single camera image patch.

Figure 5:
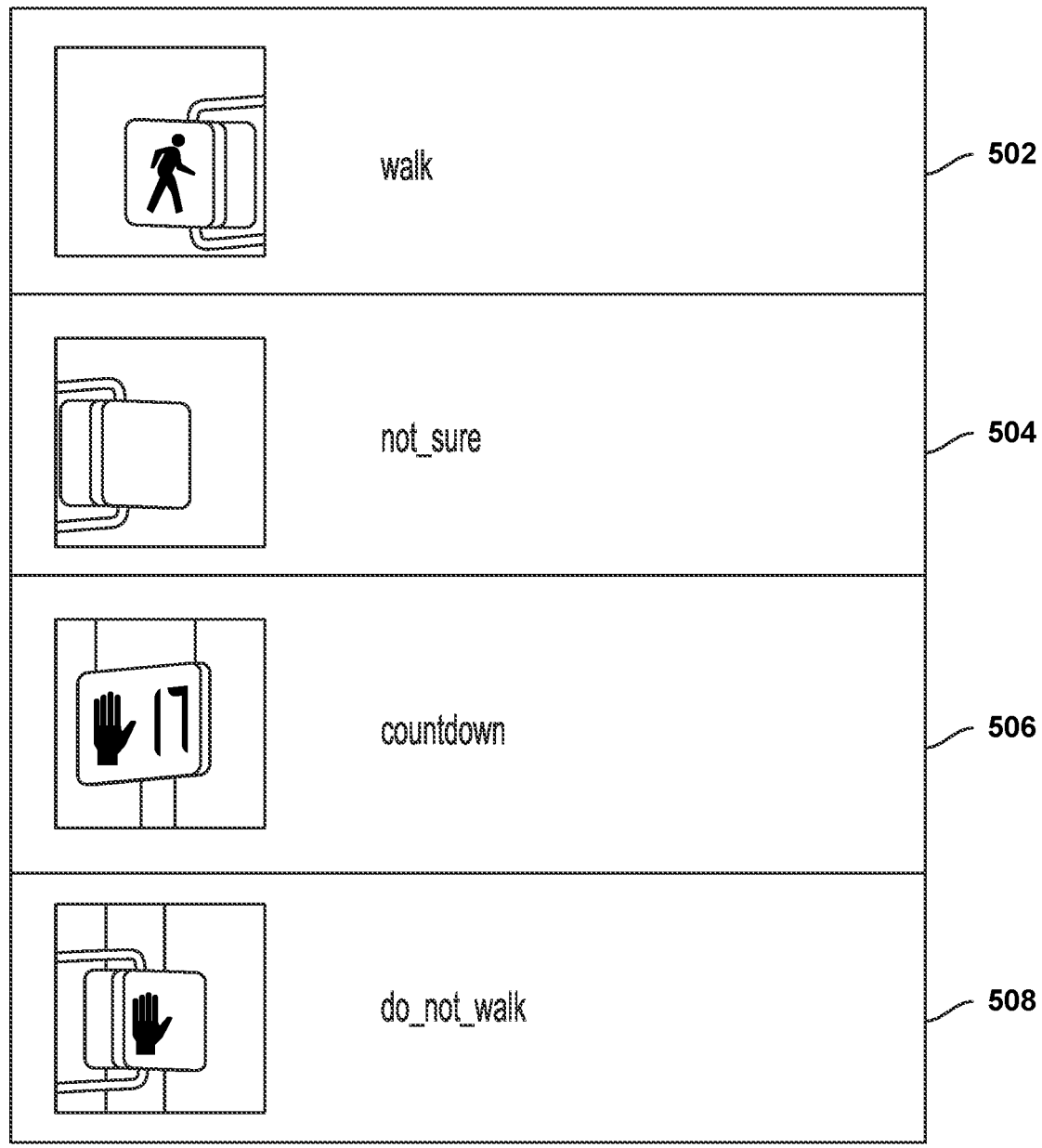
FIG. 5 is an illustration of states of a pedestrian countdown signal, according to example embodiments.

FIG. 5 is an illustration of states of a pedestrian countdown signal, according to example embodiments. As shown in FIG. 5, the states of the pedestrian countdown signal include a walk state 502, an unknown state 504, a countdown state 506, and a do not walk state 508. The computing system, or a separate computing system, can train the classifier model using camera image patches that are annotated as corresponding to respective states and, in some instances, annotated as corresponding to respective countdown values. Training the classifier model can involve learning filter kernels (e.g., feature maps or activation maps) for reliably classifying camera in age patches depicting pedestrian countdown signals into the appropriate state.

Some geographic regions (e.g., cities, town, states, etc.) may use different pedestrian countdown signals than other geographic regions. As a result, the states displayed by the pedestrian countdown signals may be different in different geographic regions. Accordingly, in some examples, the computing system can use different pedestrian countdown signal classifier models for different geographic regions.

The computing system can use the state of a pedestrian countdown signal to control operation of the vehicle in various ways. As one example, the computing system can use a state of a pedestrian countdown signal as a basis for predicting whether a pedestrian will enter a crosswalk governed by the pedestrian countdown signal. For instance, based on determining that a state of the pedestrian countdown signal is a walk state or a countdown state, the computing system can predict that a pedestrian will enter the crosswalk governed by the pedestrian countdown signal.

In some examples, the computing system determines the prediction of whether a pedestrian will enter the crosswalk based on a current state of the pedestrian countdown signal as well as a previous state of the pedestrian countdown signal. By way of example, the computing system can detect a transition of a pedestrian countdown signal from: i) a do not walk state to ii) a walk state or a countdown state. For instance, the computing system can determine that a previous state is the do not walk state and a current state is the walk state or the countdown state. Based on detecting such a transition, the computing system can predict that the pedestrian will enter the crosswalk.

In some examples, the computing system determines the prediction of whether a pedestrian will enter the crosswalk based further on a length (e.g., geographic span) of the crosswalk. For instance, when the state of a pedestrian countdown signal, is a countdown state, the computing system can determine a probability of a detected pedestrian entering the crosswalk based on a length of the crosswalk. As a particular example, the computing system can determine whether the length of the crosswalk satisfies a threshold condition (e.g., is greater than a threshold corresponding to the length of a crosswalk spanning a two-lane road). Based on determining that the state of the pedestrian countdown signal is the countdown state and that the length of the crosswalk satisfies the threshold condition, the computing system can determine a first probability that the pedestrian will enter the crosswalk. Whereas, based on determining that the state is the countdown state and the length of the crosswalk does not satisfy the threshold condition, the computing system can determine a second probability that the pedestrian will enter the crosswalk, with the second probability being greater than the first probability. The computing system can determine the length of the crosswalk by referring to a mapping database that stores widths of roads or the number of lanes per road.

In some examples, the computing system determines the prediction of whether a pedestrian will enter the crosswalk based further on whether or not the pedestrian countdown signal is governed by a pedestrian control (e.g., a pedestrian push button). For instance, based on determining that the state of the pedestrian countdown signal is a walk state or a countdown state and that the state of the pedestrian countdown signal is governed by a pedestrian control, the computing system can determine that the intent of a detected pedestrian or an occluded pedestrian (e.g., a pedestrian that is not currently detectable by the vehicle due to an obstruction) is to enter the crosswalk. The mapping data for pedestrian countdown signals can include data indicating which pedestrian countdown signals are governed by pedestrian controls. The computing system can use such mapping data to determine whether a given pedestrian countdown signal is governed by a pedestrian control. One example of a pedestrian countdown signal that is governed by a pedestrian control is a pedestrian countdown signal that only cycles through states in response to activation of the pedestrian control.

In some examples, the computing system determines the prediction of whether a pedestrian will enter the crosswalk based further on an audio signal obtained by the vehicle. For instance, the vehicle can record an audio signal using a microphone. The computing system can then determine that the audio signal is indicative of the state of the pedestrian countdown signal being a walk state or a countdown state. By way of example, the computing system can determine that the audio signal includes an audible tone or message output by an accessible pedestrian signal during a walk state or countdown state. Determining that the audio signal includes an audible tone or message can involve determining that a spectrogram of the audio signal matches a spectrogram of an expected audible tone or message. Based on determining that the audio signal is indicative of the state of the pedestrian countdown signal being a walk state or a countdown state and that the state determined using the camera image patch is the walk state or the countdown state, the computing system can predict that a pedestrian will enter the crosswalk.

Similarly, when the computing system obtains data indicating that a given pedestrian countdown signal outputs an audible tone during a walk state or a countdown state, the computing system can use the absence of the audible tone or message within an audio signal obtained by the computing system as a basis to infer that the state of the pedestrian countdown signal is not the walk state the countdown state.

In some examples, the computing system determines the prediction of whether a pedestrian will enter the crosswalk based further on a countdown value. For instance, when the state of a pedestrian countdown signal is a countdown state and the classifier model outputs a countdown value, the computing system can determine a probability of a detected pedestrian entering the crosswalk based on the classifier value. As a particular example, the computing system can determine whether the countdown value satisfies a threshold condition (e.g., is greater than a number such as five seconds, ten seconds, etc.). Based on determining that the state of the pedestrian countdown signal is the countdown state and that the countdown value satisfies the threshold condition (e.g., is greater than ten seconds), the computing system can determine a first probability that the pedestrian will enter the crosswalk. Whereas, based on determining that the state is the countdown state and the countdown value does not satisfy the threshold condition (e.g., is not greater than ten seconds), the computing system can determine a second probability that the pedestrian will enter the crosswalk, with the second probability being less than the first probability.

Figure 6:
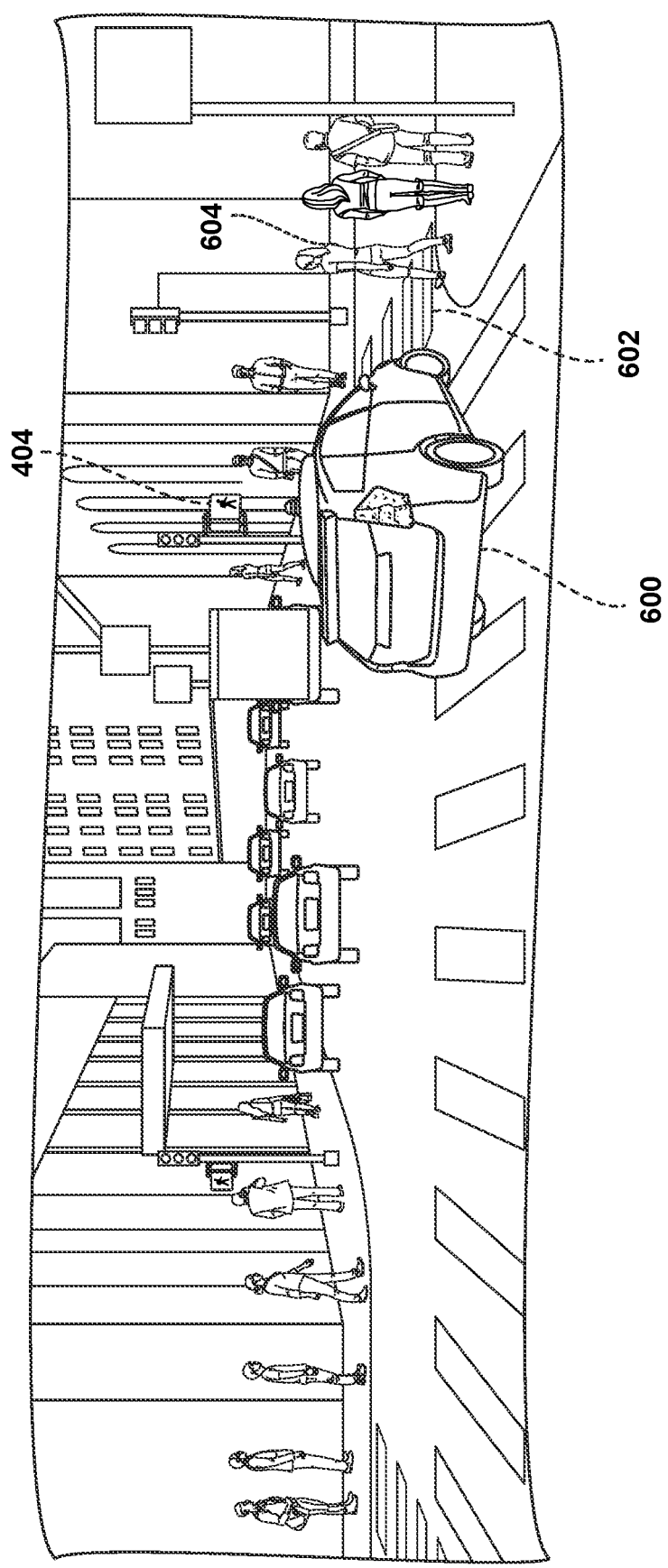
FIG. 6 is an illustration of a vehicle performing an invitation action, according to example embodiments.
Figure 7:
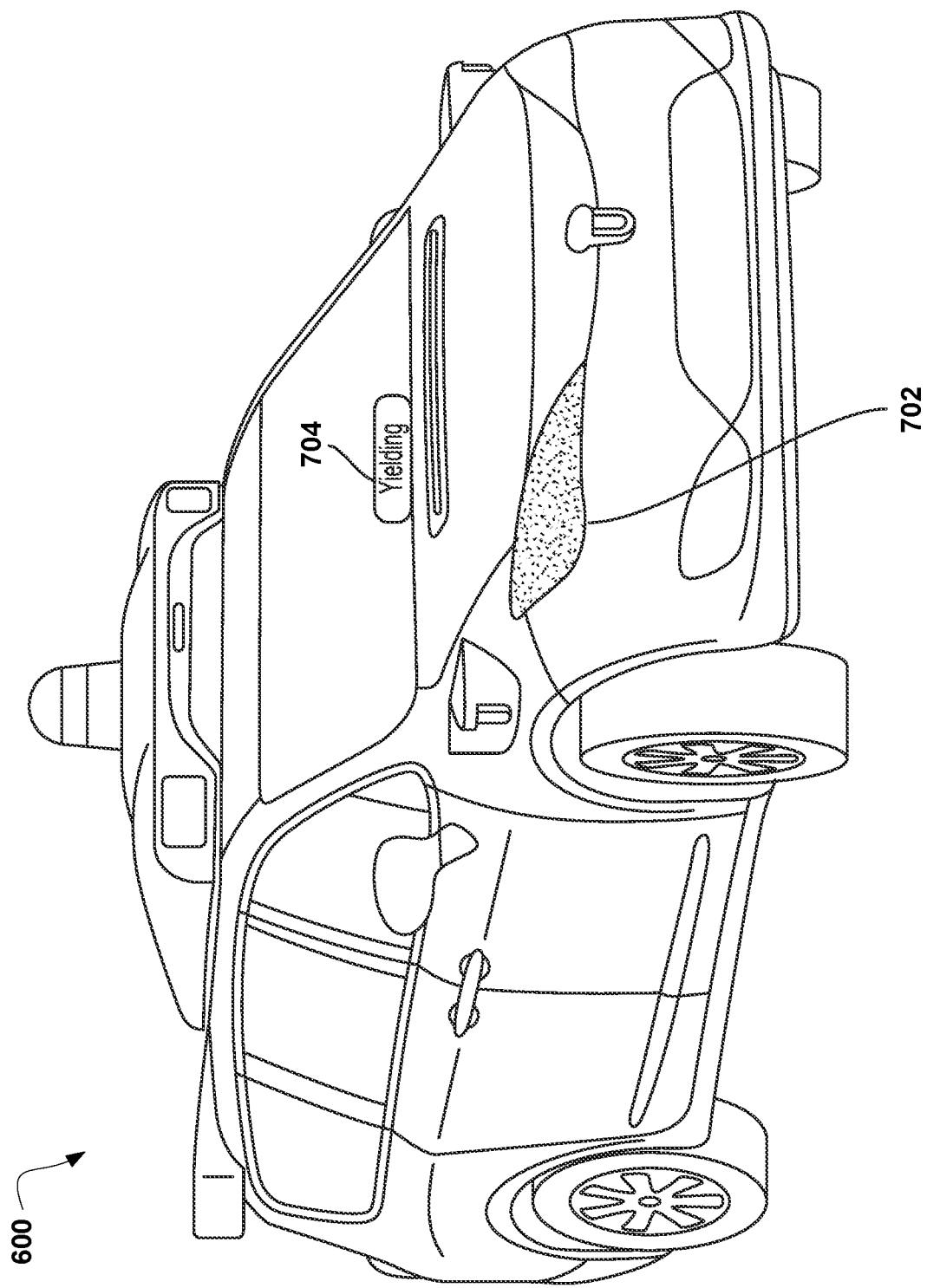
FIG. 7 is another illustration of the vehicle of FIG. 6.

Based on predicting that a pedestrian will enter a crosswalk, the computing system can cause the vehicle to perform an invitation action that invites the pedestrian to enter the crosswalk. FIGS. 6 and 7 are illustrations of a vehicle 600 performing an invitation action, according to example embodiments.

As shown in FIG. 6, pedestrian countdown signal 404 governs a crosswalk 602. The state of pedestrian countdown signal 404 is the walk state. Based on determining that the state of pedestrian countdown signal 404 is the walk state, the computing system determines that the intent of a pedestrian 604 is to enter crosswalk 602. Further, based on determining that the intent of pedestrian 604 is to enter crosswalk 602, the computing system causes the vehicle to slowly turn toward crosswalk 602 but stop before entering crosswalk 602. Transitioning from a slow turning motion to a full stop is a visible indication that pedestrian 604 and others can interpret to mean that the vehicle is inviting pedestrian 604 to cross the street via crosswalk 602.

As shown in FIG. 7, performing the invitation action can additionally or alternatively include causing a light source 702 to illuminate. For instance, the computing system can cause light source 702 to flash, pulse, glow, cycle through a color pattern, cycle through an illumination pattern, etc. Light source 702 can include a turn signal, headlight, fog light, dedicated invitation light source, etc. In instances in which the light source is a turn signal, the computing system can cause the turn signal to illuminate in a manner that is visibly distinct from a turn signal blinking pattern. As one example, the computing system can cause the turn signal to illuminate with a different color or combination of colors that differentiates the visible invitation action from the turn signal blinking pattern.

As further shown in FIG. 7, performing the invitation action can additionally or alternatively include causing a display 704 to provide a message, such as the word "fielding". In some examples, display 704 can include a flat-panel display or projector provided within the car and positioned such that the message is visible by pedestrians through a windshield of the vehicle. In other examples, display 704 can be affixed to an exterior of vehicle 600.

In line with the discussion above, performing the invitation action can additionally or alternatively include causing a speaker of the vehicle to output a sound, such as a tone, pattern of tones, word, or phrase.

The computing system can also use the state of a pedestrian countdown signal in other ways. As one example, the computing system can determine a control command for the vehicle when the state of a pedestrian countdown signal is incongruous with a crosswalk state implied by a traffic signal. For instance, the vehicle may be approaching an intersection in a right-turn lane and seeking to perform a right turn. The computing system may determine that a state of a traffic signal governing the right turn lane is a green round. In addition, the computing system may detect a pedestrian that is waiting to enter the crosswalk and determine that a state of a pedestrian countdown signal governing a crosswalk that runs parallel to the right-turn lane on the right side of the right-turn lane is a do not walk state. Based on determining that the state of the pedestrian countdown signal is the do not walk state, the computing system can cause the vehicle to turn and travel through the crosswalk ahead of the detected pedestrian (e.g., after determining that the detected pedestrian has not entered the crosswalk and the crosswalk is clear of all pedestrians). Turning and traveling through the crosswalk instead of yielding to the detected, stationary pedestrian that is not in the crosswalk in such a scenario can improve traffic flow at the intersection. Similarly, the computing system can determine that the vehicle can safely perform a right-turn on red when the state of the traffic signal is red, the intersection and the crosswalk are clear, and the state of the pedestrian countdown signal is a do not walk state.

As another example, the computing system can publish the state of the pedestrian countdown signal and an identifier of a crosswalk governed by the pedestrian countdown signal for use in predicting pedestrian behavior. A behavior prediction model can use the state of the pedestrian countdown signal to refine the predicted behavior of a detected pedestrian that is waiting at the identified crosswalk or traveling toward the identified crosswalk. For instance, the behavior prediction model can set the likelihood of the detected pedestrian entering a crosswalk as a first likelihood based on the state being a walk state or set the likelihood of the detected pedestrian entering a crosswalk as a second, lower likelihood based on the state being a do not walk state.

Alternatively, based on the state, the behavior prediction model can increase or decrease a previously determined likelihood of the detected pedestrian entering the crosswalk. A planner model can then use the predicted behavior of the detected pedestrian as an input for determining how to control motion of the vehicle.

As yet another example, the computing system can use the state of the pedestrian countdown signal to refine the predicted behavior of a cyclist or scooter rider. For instance, for a detected cyclist approaching a crosswalk along a path or road that is parallel to the crosswalk, based on determining that the state of a pedestrian countdown signal is a countdown state, the computing system can increase a probability that the cyclist will accelerate and/or increase a probability that the cyclist will continue along the path or road that is parallel to the crosswalk. The cyclist may be traveling in the same direction as the vehicle or in a direction that is opposite to the direction of the vehicle.

As yet another example, the computing system can use the state of a pedestrian countdown signal at an upcoming intersection as a basis to determine a path through a current intersection. For instance, a route of the vehicle may involve turning right at the upcoming intersection. Based on determining that the state of a pedestrian countdown signal at the upcoming intersection is a countdown state and that an adjacent street runs parallel to the current street, the computing system can cause the vehicle to turn right at the current intersection. In this manner, the vehicle can avoid having to stop at the upcoming intersection, thereby decreasing the route time for the vehicle.

Figure 8:
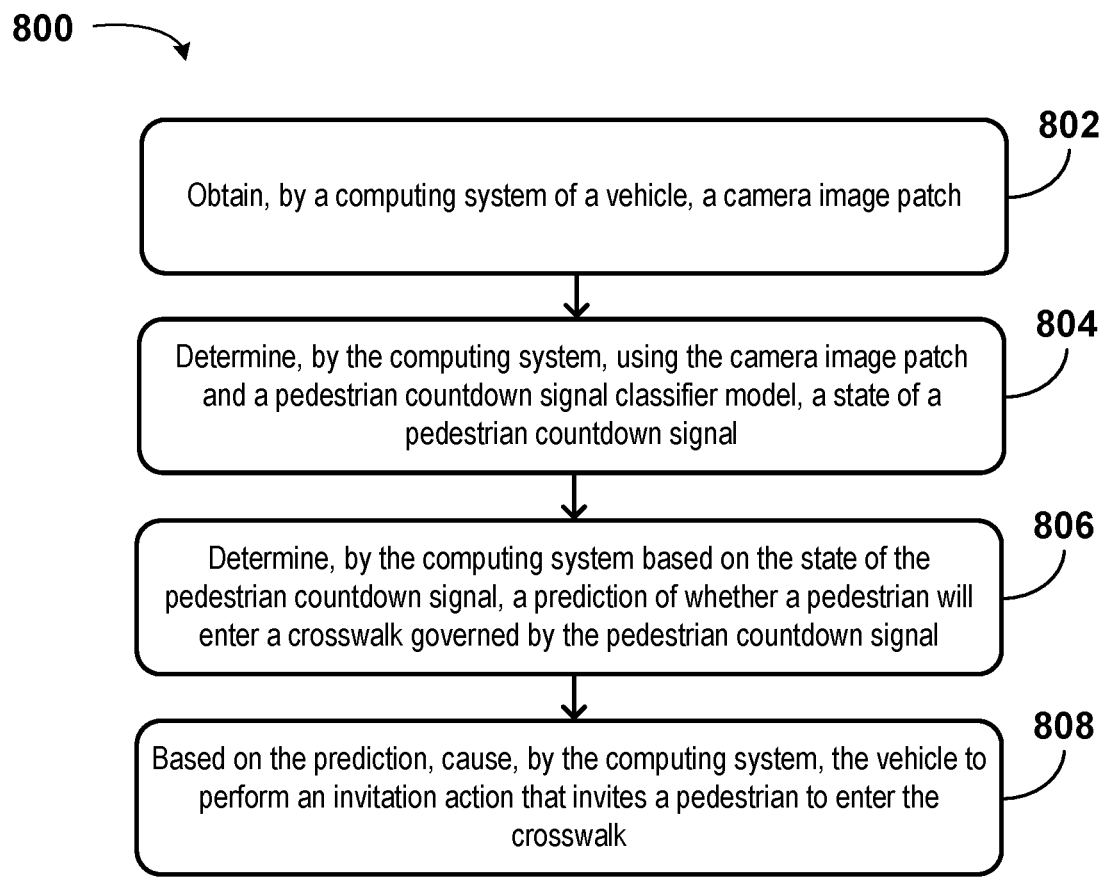
FIG. 8 is a flowchart of a method, according to example embodiments.

FIG. 8 is a flowchart of a method 800, according to example embodiments. In some embodiments, method 800 may be performed to help predict whether a pedestrian will enter a crosswalk governed by a pedestrian countdown signal. In some embodiments, method 800 may be performed by a computing system (e.g., computer system 112 of FIG. 1).

At block 802, method 800 may include obtaining, by a computing system of a vehicle, a camera image patch. At block 804, method 800 may include determining, by the computing system using the camera image patch and a pedestrian countdown signal classifier model, a state of a pedestrian countdown signal. At block 806, method 800 may include determining, by the computing system based on the state of the pedestrian countdown signal, a prediction of whether a pedestrian will enter a crosswalk governed by the pedestrian countdown signal. And at block 808, method 800 may include based on the prediction, causing, by the computing system, the vehicle to perform an invitation action that invites a pedestrian to enter the crosswalk.

In some embodiments of method 800, the invitation action may include turning toward the crosswalk and then stopping before entering the crosswalk. In some embodiments of method 800, the invitation action may include illuminating a light source. In some embodiments of method 800, the invitation action may include displaying a message. In some embodiments of method 800, the invitation action may include outputting a sound.

In some embodiments, method 800 may include detecting, by the computing system, a transition of the pedestrian countdown signal from: i) a do not walk state to ii) a walk state or a countdown state. The prediction may then be further based on the detection of the transition.

In some embodiments, method 800 may include determining a length of the crosswalk. The prediction may then be further based on the length of the crosswalk.

In some embodiments of the method 800, the state of the pedestrian countdown signal is a walk state or a countdown state. Method 800 may then include determining that the state of the pedestrian countdown signal is governed by a pedestrian control. And the prediction may then be further based on the determining that the state of the pedestrian countdown signal is governed by the pedestrian control. Further, the determining the prediction may include determining that an occluded pedestrian's intent is to enter the crosswalk based on the state of the pedestrian countdown signal and the determining that the pedestrian countdown signal is governed by the pedestrian control.

In some embodiments, method 800 may include obtaining an audio signal, and determining that the audio signal is indicative of the state of the pedestrian countdown signal being a walk state or a countdown state. The prediction may then be further based on the determining that the audio signal is indicative of the state of the pedestrian countdown signal being the walk state or the countdown state.

In some embodiments of method 800, the pedestrian countdown signal classifier model is a classification CNN that is configured to classify the state of the pedestrian countdown signal as being one of multiple states.

In some embodiments of method 800, obtaining the camera image patch includes obtaining an image using a camera coupled to the vehicle, and using a mapped position of the pedestrian countdown signal to select from within the image a camera image patch in which the pedestrian countdown signal is visible. Additionally, method 800 can include determining that an orientation of the pedestrian countdown signal with respect to an orientation of the vehicle satisfies a threshold condition, and obtaining the image based on the determining that the orientation of the pedestrian countdown signal with respect to the orientation of the vehicle satisfies the threshold condition.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect, to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A computer-implemented method comprising:
    obtaining, by a computing system of a vehicle, a camera image patch;
    determining, by the computing system, using the camera image patch and a pedestrian countdown signal classifier model, a state of a pedestrian countdown signal;
    determining, by the computing system based on the state of the pedestrian countdown signal, a prediction of whether a pedestrian will enter a crosswalk governed by the pedestrian countdown signal; and
    based on the prediction, causing, by the computing system, the vehicle to perform an invitation action that invites a pedestrian to enter the crosswalk.

2. The computer-implemented method of claim 1, wherein the invitation action comprises turning toward the crosswalk and then stopping before entering the crosswalk.

3. The computer-implemented method of claim 1, wherein the invitation action comprises illuminating a light source.

4. The computer-implemented method of claim 1, wherein the invitation action comprises displaying a message.

5. The computer-implemented method of claim 1, wherein the invitation action comprises outputting a sound.

6. The computer-implemented method of claim 1, further comprising detecting, by the computing system, a transition of the pedestrian countdown signal from: i) a do not walk state to ii) a walk state or a countdown state,
    wherein the prediction is further based on the detecting of the transition.

7. The computer-implemented method of claim 1, further comprising determining a length of the crosswalk,
    wherein the prediction is further based on the length of the crosswalk.

8. The computer-implemented method of claim 1, wherein:
    the state of the pedestrian countdown signal is a walk state or a countdown state,
    the method further comprises determining that the state of the pedestrian countdown signal is governed by a pedestrian control, and
    the prediction is further based on the determining that the state of the pedestrian countdown signal is governed by the pedestrian control.

9. The computer-implemented method of claim 8, wherein the determining the prediction comprises determining that an occluded pedestrian's intent is to enter the crosswalk based on the state of the pedestrian countdown signal and the determining that the pedestrian countdown signal is governed by the pedestrian control.

10. The computer-implemented method of claim 1, further comprising:
    obtaining an audio signal; and
    determining that the audio signal is indicative of the state of the pedestrian countdown signal being a walk state or a countdown state,
    wherein the prediction is further based on the determining that the audio signal is indicative of the state of the pedestrian countdown signal being the walk state or the countdown state.

11. The computer-implemented method of claim 1, wherein the pedestrian countdown signal classifier model is a classification convolutional neural network that is configured to classify the state of the pedestrian countdown signal as being one of multiple states.

12. The computer-implemented method of claim 1, wherein obtaining the camera image patch comprises:
    obtaining an image using a camera coupled to the vehicle; and
    using a mapped position of the pedestrian countdown signal to select from within the image a camera image patch in which the pedestrian countdown signal is visible.

13. The computer-implemented method of claim 12, further comprising:
    determining that an orientation of the pedestrian countdown signal with respect to an orientation of the vehicle satisfies a threshold condition; and
    obtaining the image based on the determining that the orientation of the pedestrian countdown signal with respect to the orientation of the vehicle satisfies the threshold condition.

14. A vehicle configured to be operated in an autonomous mode, the vehicle comprising:
    a memory;
    a processor coupled to the memory; and
    instructions stored in the memory and executable by the process to perform functions comprising:
        obtaining a camera image patch;

determining, using the camera image patch and a pedestrian countdown signal classifier model, a state of a pedestrian countdown signal;

determining, based on the state of the pedestrian countdown signal, a prediction of whether a pedestrian will enter a crosswalk governed by the pedestrian countdown signal; and based on the prediction, causing the vehicle to perform an invitation action that invites a pedestrian to enter the crosswalk.

15. The vehicle of claim 14, wherein the invitation action comprises turning toward the crosswalk and then stopping before entering the crosswalk.

16. The vehicle of claim 14, wherein the invitation action comprises illuminating a light source.

17. The vehicle of claim 14, wherein the invitation action comprises displaying a message.

18. The vehicle of claim 14, wherein the invitation action comprises outputting a sound.

19. The vehicle of claim 14, wherein:

the functions further comprise detecting a transition of the pedestrian countdown signal from: i) a do not walk state to ii) a walk state or a countdown state, and wherein the prediction is further based on the detecting of the transition.

20. A non-transitory computer-readable medium having stored therein instructions executable by a computing system to cause the computing system to perform functions comprising:

obtaining a camera image patch;

determining, using the camera image patch and a pedestrian countdown signal classifier model, a state of a pedestrian countdown signal;

determining, based on the state of the pedestrian countdown signal, a prediction of whether a pedestrian will enter a crosswalk governed by the pedestrian countdown signal; and based on the prediction, causing a vehicle to perform an invitation action that invites a pedestrian to enter the crosswalk.

* * * * *